(12) United States Patent
Ito et al.

(10) Patent No.: US 11,981,282 B2
(45) Date of Patent: May 14, 2024

(54) AIRBAG DEVICE AND VEHICLE SEAT

(71) Applicants: Autoliv Development AB, Vargarda (SE); Yoshiki Ito, Kanagawa (JP); Yutaka Nakajima, Kanagawa (JP)

(72) Inventors: Yoshiki Ito, Kanagawa (JP); Yutaka Nakajima, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/754,743

(22) PCT Filed: Sep. 17, 2020

(86) PCT No.: PCT/JP2020/035243
§ 371 (c)(1),
(2) Date: Apr. 11, 2022

(87) PCT Pub. No.: WO2021/070592
PCT Pub. Date: Apr. 15, 2021

(65) Prior Publication Data
US 2024/0083381 A1    Mar. 14, 2024

(30) Foreign Application Priority Data
Oct. 11, 2019   (JP) ................................ 2019-187482

(51) Int. Cl.
*B60R 21/207*    (2006.01)
*B60R 21/00*     (2006.01)
(Continued)

(52) U.S. Cl.
CPC ...... *B60R 21/207* (2013.01); *B60R 21/23138* (2013.01); *B60R 21/233* (2013.01); *B60R 21/237* (2013.01); *B60R 2021/0048* (2013.01)

(58) Field of Classification Search
CPC ............ B60R 21/207; B60R 21/23138; B60R 21/233; B60R 21/237; B60R 2021/0048
See application file for complete search history.

(56) References Cited

U.S. PATENT DOCUMENTS

| 10,189,431 B2 * | 1/2019 | Yamamoto ............ B60R 21/237 |
| 10,315,606 B2 * | 6/2019 | Ohno ................ B60R 21/23138 |

(Continued)

FOREIGN PATENT DOCUMENTS

| DE | 102017119719 A1 * | 3/2018 | ........... B60R 21/213 |
| EP | 3098116 A1 * | 11/2016 | ........... B60R 21/207 |

(Continued)

OTHER PUBLICATIONS

Office Action received in corresponding Chinese Patent Application 202080067254.9, dated Mar. 28, 2023 with translation.

*Primary Examiner* — Drew J Brown
(74) *Attorney, Agent, or Firm* — Harness, Dickey & Pierce, P.L.C.; Stephen T. Olson

(57) ABSTRACT

When an occupant has moved from a normal seating position, a case can occur where a hood-type airbag cannot be expanded and deployed since the airbag is stopped in the process of expansion and deployment due to contact with the head of the occupant. An airbag device is provided having an airbag, and an inflator for supplying gas to the airbag. In an expanded and deployed state where expansion and deployment of the airbag has been finished, the airbag includes a head protection chamber for blanketing an occupant from a vertex part of the head to a temporal part of the head, and a pair of lateral part protection chambers that are arranged on both of the left/right sides of the head protection chamber and that blanket lateral sides of the occupant.

14 Claims, 10 Drawing Sheets

(51) Int. Cl.
B60R 21/231 (2011.01)
B60R 21/233 (2006.01)
B60R 21/237 (2006.01)

(56) References Cited

U.S. PATENT DOCUMENTS

| | | | |
|---|---|---|---|
| 11,338,757 B2* | 5/2022 | Hagg | B60R 21/207 |
| 2016/0347272 A1* | 12/2016 | Kato | B60R 21/233 |
| 2017/0158155 A1* | 6/2017 | Ohno | B60R 21/237 |
| 2018/0037185 A1* | 2/2018 | Minami | B60R 21/2334 |
| 2023/0303027 A1* | 9/2023 | Yamamoto | B60R 21/2338 |

FOREIGN PATENT DOCUMENTS

| | | |
|---|---|---|
| JP | 2006-306377 A | 11/2006 |
| JP | 2012-136155 A | 7/2012 |
| JP | 2018-83554 A | 5/2018 |
| JP | 2019-14477 A | 1/2019 |
| WO | 2016/174785 A1 | 11/2016 |
| WO | 2018/114723 A1 | 6/2018 |

* cited by examiner

AIRBAG DEVICE AND VEHICLE SEAT

TECHNICAL FIELD

The present invention relates to an airbag device that integrally protects the head, shoulder, upper arm, and lateral portions of the chest, and in some cases, the abdomen and lateral portions of the waist of the occupant, during a vehicle collision or rollover, for example, and to a vehicle seat equipped with said airbag device.

Hereinafter, in the present application, "above" and "upper" mean the head direction of an occupant in a regular seating position of a vehicle seat, and "below" and "lower" mean the foot direction of the same occupant. The terms "front" and "forward" refer to the front direction of the occupant in a regular seating position of the vehicle seat, and "rear" and "back" refer to the rear direction of the same occupant. The terms "left" and "left side" refer to the left-hand direction of the occupant in a regular seating position of the vehicle seat, and "right" and "right side" refer to the right-hand direction of the same occupant. A "regular position" refers to a position at the center of the seat cushion constituting the vehicle seat in the left-right direction, along which the occupant's entire back is in contact with the seatback constituting the vehicle seat. Hereinafter, "regular position" is also referred to as "regular seating position".

BACKGROUND ART

In recent years, airbag devices have been proposed in which a hood-shaped (shell-shaped) airbag ejects from a vehicle seat to cover and protect a head region of an occupant and a side portion of a shoulder region, upper arm region, and chest region of the occupant in the event of a vehicle collision or rollover for example (for example, Patent Documents 1 and 2).

In this manner, when a vehicle is impacted by a collision or rollover, occupants move forward, diagonally forward, to the side, or upward from their regular seating position. In such a case, a hood-type airbag that ejects from the vehicle seat may come into contact with the head of the occupant during expansion and deployment thereof.

If the airbag in the process of expansion and deployment comes into contact with the occupant, the frictional drag upon contact may stop the expansion and deployment of the airbag 12, as illustrated in FIG. 10A and FIG. 10B. FIG. 10A illustrates the case where the occupant 2 moves forward due to a collision, and FIG. 10B illustrates the case where the occupant 2 moves diagonally forward in a collision.

PRIOR ART DOCUMENTS

Patent Documents

[Patent Document 1] Japanese Unexamined Patent Application 2019-14477
[Patent Document 2] Japanese Unexamined Patent Application 2018-83554

SUMMARY OF THE INVENTION

Problem to be Solved by the Invention

The problem to be solved by the present invention is that if an occupant moves from the regular seating position due to an impact applied to the vehicle, a hood-type airbag may contact the head of the occupant and stop in the middle of expansion and deployment, and the airbag may not expand and deploy.

Means to Solve the Problem

An object of the present invention is to solve the aforementioned problem by, for example, preventing the hood-type airbag from stopping in the middle of expansion and deployment even if the hood-type airbag comes into contact with the head of the occupant.

In other words, the present invention is an airbag device containing an airbag that integrally covers the head and side portion of an occupant seated on a vehicle seat, and an inflator that supplies gas to the airbag, and has the following configuration.

In the expanded and deployed state of the airbag, the airbag has a head protecting chamber that covers the head of the occupant from the top of the head to the side of the head, and a pair of side protecting chambers that are located on the left and right sides of said head protecting chamber and cover the sides of the occupant. In addition, the present invention is provided with a slip cloth that is deployed to cover the head of the occupant in conjunction with expansion of the airbag, a cloth positioned on the side of the head protecting chamber relative to an object such as the head of the occupant in a state of expansion and deployment (including not only the human body itself but also objects covering the head, such as hats, bandages, and helmets), where the dynamic coefficient of friction between the cloth and the object is smaller than that of the outer surface of the airbag.

The airbag is housed either rolled into a roll shape or folded in a bellows shape from a first side portion of the backrest portion of the vehicle seat, through an upper part, and to a second side portion. Specifically, the head protecting chamber is stowed in the upper part of the backrest portion, and the pair of side protecting chambers are stowed in opposing positions on the left and right sides of the backrest portion, separated from each other. The upper part of the backrest portion means the upper part of the headrest if the headrest is formed as an integral part of the backrest portion.

In this manner, during expansion and deployment of the airbag, the head protecting chamber expands and deploys from the top of the seat backrest portion toward the front. The side protecting chambers, on the other hand, expand and deploy from the left and right sides of the seat backrest portion toward the front. If a headrest is separately attached to the top of the backrest portion, the head protecting chamber will expand and deploy forward, bursting over the headrest.

In this case, even if the occupant moves from the regular seating position during a collision or rollover, the slip cloth, not the airbag, will be in contact with the head of said occupant. Therefore, the airbag slides on or with the slip cloth, and does not stop in the middle of expansion and deployment due to contact with the head.

When the unexpanded airbag is unfolded and laid flat, the length of the slip cloth in the front-to-back direction should be substantially the same length as the length of the head protecting chamber in the front-to-back direction. With such a length in the front-to-back direction, the airbag will ensure that the slip cloth will contact and cover the head of an occupant who has moved from the regular seating position to the front-to-back direction.

On the other hand, it is desirable that the length of the slip cloth in the left-right direction when the unexpanded airbag is unfolded and laid flat is at least long enough to cover the upper edge of the headrest of the vehicle seat. This is because if the length in the left-right direction is less than such a length, the slip cloth may not contact the head of an occupant who has moved from the regular seating position in the left-right direction during airbag expansion and deployment.

The slip cloth should be connected to the airbag at least on either the side of the airbag attached to the vehicle seat or the non-attached side of the vehicle seat. Here, the "attached side of the vehicle seat" indicates a first side at the end of the airbag in the shortitudinal direction (direction perpendicular to the longitudinal direction) when the airbag (for example, unexpanded airbag) is unfolded and laid flat that is in contact with or in close proximity to the vehicle seat when the airbag is expanded and deployed. The "non-attached side of the vehicle seat" indicates a second side in said shortitudinal direction that is far away from the vehicle seat when the airbag is expanded and deployed.

When the slip cloth is connected to the airbag on the side of the airbag non-attached side of the vehicle seat, for example, near the front end of the slip cloth and near the front end of the airbag can be connected. Here, "front end" means the forward end of the vehicle seat in the front/rear direction of the vehicle.

In this manner, even if the occupant moves from the regular seating position, the slip cloth can be reliably interposed between said head of the occupant and the head protecting chamber. If the airbag is connected at two points, one on the attached side of the vehicle seat and the other on the non-attached side, the slip cloth can be more securely interposed between the head of the occupant and the head protecting chamber.

If the aforementioned slip cloth is rolled into a roll shape or folded into a bellows shape while superimposed on the airbag when housed in the vehicle seat, the airbag will slide and deploy on the head of the occupant together with the slip cloth after the slip cloth comes in contact with the head of the occupant.

On the other hand, if the upper part of the slip cloth is folded independently of the airbag when stowed in the vehicle seat, the slip cloth can unravel and contact the head of the occupant before the airbag expands and deploys. In this case, the upper folded portion should be located on top of the airbag in the rolled or folded state.

In this case, on the upper side of the airbag in the folded or rolled state, the upper part of the slip cloth that is continuous with the portion of the fabric that extends from below, should have a rearward extending part that extends backward along the upper surface of the airbag and a bellows-like portion that is folded upward from said rearward extending part in a bellows-like manner.

When the upper part of the slip cloth is folded in the aforementioned bellows shape, during airbag expansion and deployment, the slip cloth will move prior to the airbag and come into contact with the head of the occupant who has moved from the regular seating position, and the airbag will deploy over said slip cloth.

The airbag device of the present invention places the head protecting chamber above the backrest portion of the seat so that the slip cloth covers the head of the occupant in the expanded and deployed state of the rolled or bellows-folded airbag. On the other hand, the side protecting chambers are housed on the left and right sides of the backrest portion, spaced apart from each other and facing each other. This is a vehicle seat of the present invention.

Effect of the Invention

In the present invention, even if an occupant moves from the regular seating position during a collision or rollover, for example, the hood-type airbag can be prevented from stopping in the middle of expansion and deployment because the slip cloth contacts and covers the head of the occupant in question. Therefore, the airbag reliably expands and deploys to properly cover the head and lateral areas such as the shoulders, upper arms, and chest of the occupant, thereby improving safety.

DESCRIPTION OF THE PREFERRED EMBODIMENTS

Figure 1:
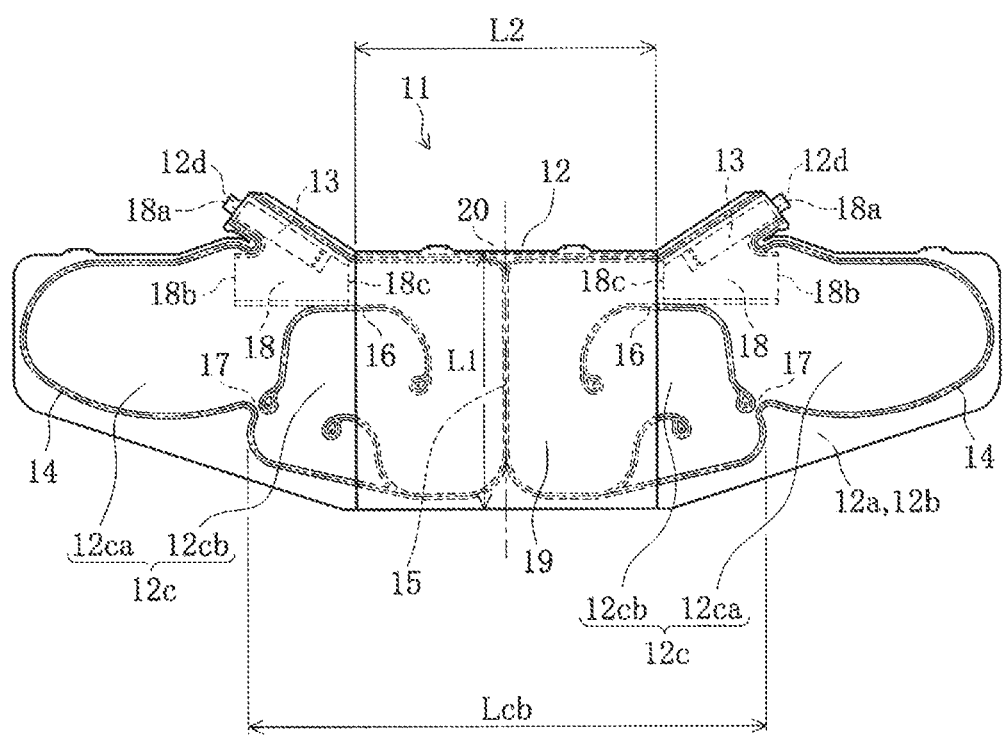
FIG. 1 is a diagram of embodiment 1 of the airbag that makes up the airbag device of the present invention, illustrating the airbag in a non-deployed state unfolded and laid flat.

If an occupant moves from the regular seating position, a hood-type airbag that has ejected from the vehicle seat may come into contact with the head of the occupant and stop during expansion and deployment, preventing the airbag from expanding and deploying.

The present invention solves the aforementioned problem by providing a slip cloth on the surface side of the head protecting chamber on the side relative to the head of the occupant in an airbag having a head protecting chamber and a pair of side protecting chambers located on the left and right sides of this head protecting chamber.

EMBODIMENTS

Embodiment 1 of the invention is described below using FIG. 1 to FIG. 7B.

The airbag device 11 of the present invention includes an airbag 12 that covers the head 2a, the side portion 2b of a shoulder 2ba, upper arm 2bb, and chest 2bc, for example, of an occupant 2 seated in a vehicle seat 1, and an inflator 13 (cylindrical, for example) that ejects gas into the interior of the airbag 12.

Figure 2A:
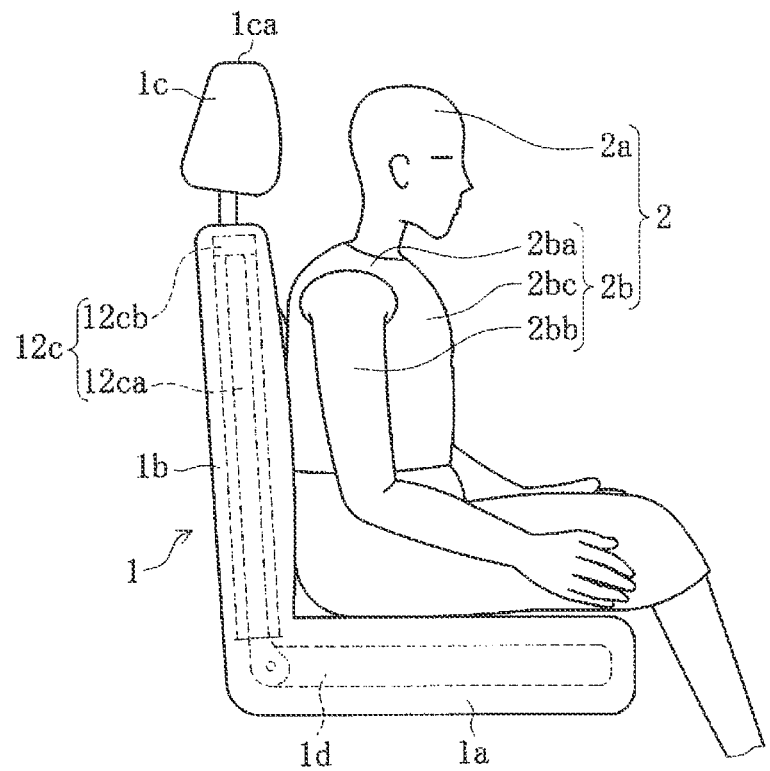
FIG. 2A is a diagram of a vehicle seat with the airbag device of the present invention attached viewed from the side of the vehicle, illustrating a headrest separately attached to the backrest portion of the vehicle seat.
Figure 2B:
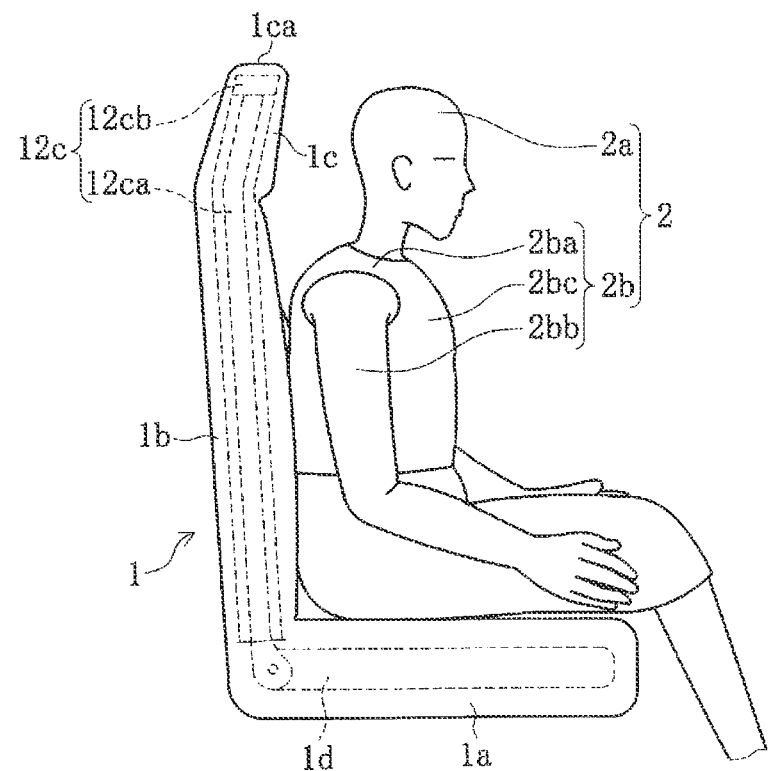
FIG. 2B is a diagram of a vehicle seat with the airbag device of the present invention attached viewed from the side of the vehicle, illustrating a headrest integrally formed with the backrest portion.

The vehicle seat 1 has a seat cushion 1a and a backrest portion 1b. A headrest 1c is separately attached to the upper part of the backrest portion 1b, as illustrated in FIG. 2A. Alternatively, as illustrated in FIG. 2B, the headrest 1c is formed as an integral part of the upper part of the backrest portion 1b. The seat cushion 1a and the backrest portion 1b are supported by a frame 1d (see FIG. 2A, FIG. 2B, FIG. 3A, and FIG. 3B).

The airbag 12 has a shape where a left-right direction is longer than an up-down direction, as illustrated in FIG. 1 for example. Furthermore, two identical sheets 12a and 12b are overlaid and sewing is performed at an outer peripheral portion and center portion in the left-right direction to form expandable chambers 12c on both left and right sides. In FIG. 1, the sewed part of the outer periphery is marked with a code 14, the sewed part of the center in the left-right direction is marked with a code 15, and the sewed part of the airbag 12 that is covered by the slip cloth 19 is represented by a dashed line.

Furthermore, the left and right chambers 12c are demarcated by sewing in the inner portion thereof into side protecting chambers 12ca positioned on left and right end portion sides of the airbag 12, and a head protecting chamber 12cb positioned on the center portion of the left and right portions of the airbag 12. In FIG. 1, the inner portion sewed part is marked with a code 16. In the fully expanded and deployed state of the airbag 12 (hereinafter referred to as the "expanded and deployed state"), the side protecting chamber 12ca covers the side portion 2b of the torso of the occupant 2, and the head protecting chamber 12cb covers the head 2a of the occupant 2 (specifically, from the crown of the head to the side of the head). Note that with respect to the chambers 12c, side protecting chamber 12ca, and head protecting chamber 12cb, "chamber" refers not only to the interior space, but also to the sheets 12a and 12b that form that interior space.

In FIG. 1, a ventilating port 17 is formed between the side protecting chambers 12ca and head protecting chamber 12cb by not allowing an end side of the sewed part 16 to connect with the sewed part 14 on the outer peripheral portion. The ventilating port 17 is used to cause gas to flow from the side protecting chamber 12ca to the head protecting chamber 12cb when the side protecting chamber 12ca is fully expanded. This compensates for the gas supply to the head protecting chamber 12cb.

The airbag 12, for example, is formed with an insertion part 12d for the inflator 13 for each of the chambers 12c on the left and right sides. Furthermore, gas is supplied to said left and right chambers 12c from separate inflators 13, and the left and right chambers 12c are configured to be fluidly independent.

In FIG. 1, the insertion part 12d is provided with an approximately Y-shaped gas guide 18. The gas guide 18 has an inlet 18a where the inflator 13 is inserted, a first outlet 18b that guides gas ejected from the inflator 13 into the side protecting chamber 12ca, and a second outlet 18c that guides the gas into the head protecting chamber 12cb. A cross-sectional area of the first outlet 18b and second outlet 18c are appropriately determined based on an amount of gas supplied to the side protecting chambers 12ca and head protecting chamber 12cb.

The airbag device 11 is further provided with a slip cloth 19 that has a smaller dynamic coefficient of friction than the outer surface of the airbag 12 (head protecting chamber 12cb). The material of the slip cloth 19 can be a cloth or other material with a fluoroplastic coated surface. In an expanded and deployed state, the slip cloth 19 is positioned on the surface side of the head protecting chamber 12cb of the airbag 12 facing the head 2a of the occupant 2 (in other words, positioned along the outer surface of the head protecting chamber 12cb).

Regarding the dimensions of the slip cloth 19, in a state where the airbag 12 is unexpanded (pre-expansion) and laid flat on a flat surface (a state seen in FIG. 1, hereinafter referred to as a "flat state"), the length in the front-to-back direction L1 of the slip cloth 19 (length in the up-down direction in FIG. 1) is substantially the same length as the length in the front-to-back direction of the head protecting chamber 12cb. Even in an expanded and deployed state, the length in the front-to-back direction of the slip cloth 19 is substantially the same length as the length in the front-to-back direction of the head protecting chamber 12cb. This ensures that in the expanded and deployed state, the slip cloth 19 covers the head 2a of the occupant 2, who has moved in the front-back direction from the regular seating position.

On the other hand, in a flat state of the airbag 12, the length in the left-right direction L2 of the slip cloth 19 (length in the left-right direction as seen in FIG. 1) should at least be a length capable of covering the entire left-right direction of the upper end part 1ca of the headrest 1c of the vehicle seat 1, and can be more than the width W of the upper end part 1ca of the headrest 1c (see FIG. 3). For example, the length in the left-right direction L2 of the slip cloth 19 is set ⅔ the length in the left-right direction Lcb of the two head protecting chambers 12cb on the left and right (see FIG. 1).

This slip cloth 19 prevents the airbag 12 from stopping during expansion and deployment due to the airbag 12 making contact with the head 2a of the occupant 2 at the time of a collision, rollover, or the like, where the occupant 2 moves forward, diagonally forward, in the left-right direction, or in the upper direction from a regular seating position.

In FIG. 1, the slip cloth 19 is connected to the airbag 12 by a sewed part 20 only on the upper side as see in FIG. 1, which is the attachment side of the airbag 12 to the vehicle seat 1.

Figure 3A:
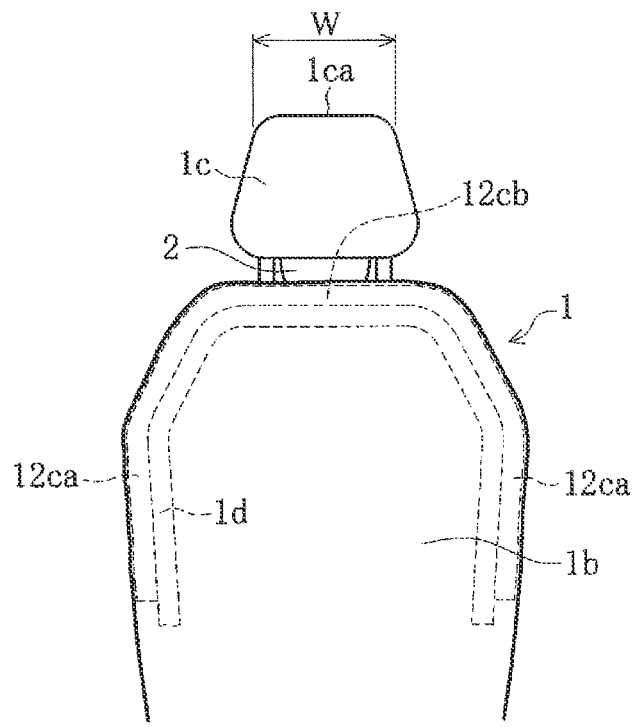
FIG. 3A is a diagram of the vehicle seat in FIG. 2A with the airbag device of the present invention attached, viewed from the rear of the vehicle.
Figure 3B:
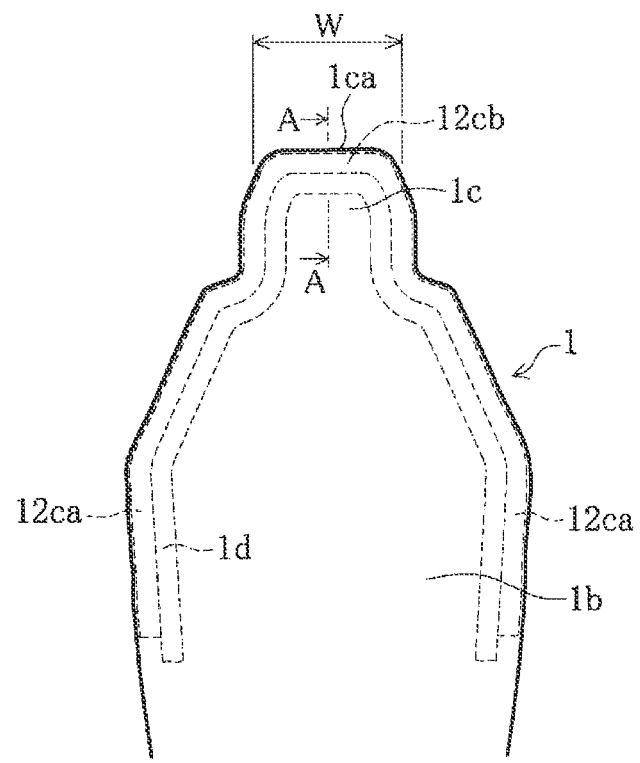
FIG. 3B is a diagram of the vehicle seat in FIG. 2B with the airbag device of the present invention attached, viewed from the rear of the vehicle.

The airbag 12 is stowed in the vehicle seat 1 in a state of being rolled into a roll shape. Alternatively, the airbag 12 is stowed in the vehicle seat 1 in a state of being folded into a bellows shape. Specifically, the head protecting chamber 12cb is positioned on the upper part of the backrest portion 1b of the vehicle seat 1 (see FIG. 2A, FIG. 2B, FIG. 3A, and FIG. 3B). FIG. 2A and FIG. 3A illustrate the headrest 1c separately attached to the backrest portion 1b. Furthermore, FIG. 2B and FIG. 3B illustrate the headrest 1c integrated with the backrest portion 1b. On the other hand, the side protecting chambers 12ca are positions separated and facing each other on both sides in the left-right direction of the backrest portion 1b (see FIG. 3A and FIG. 3B). In this case, in the present invention, the slip cloth 19 attached to the surface of the head protecting chamber 12cb is housed as to face and cover the head 2a of the occupant 2 during expansion and deployment of the airbag 12. This is the vehicle seat 1 of the present invention.

Figure 4A:
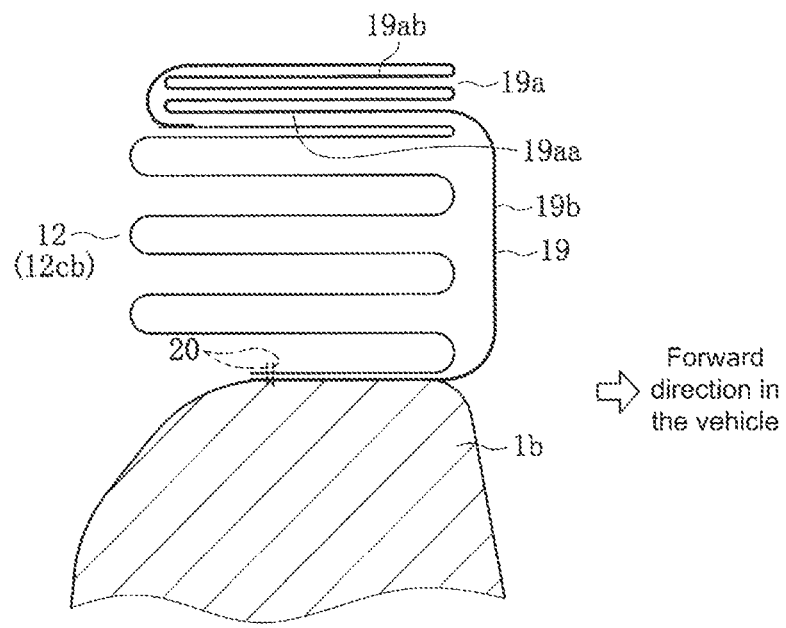
FIG. 4A is a diagram illustrating embodiment 1, a state in which a slip cloth is stowed when the airbag is folded in a bellows shape when the airbag device of the present invention is attached to the vehicle seat, viewed from direction A-A in FIG. 3B.
Figure 4B:
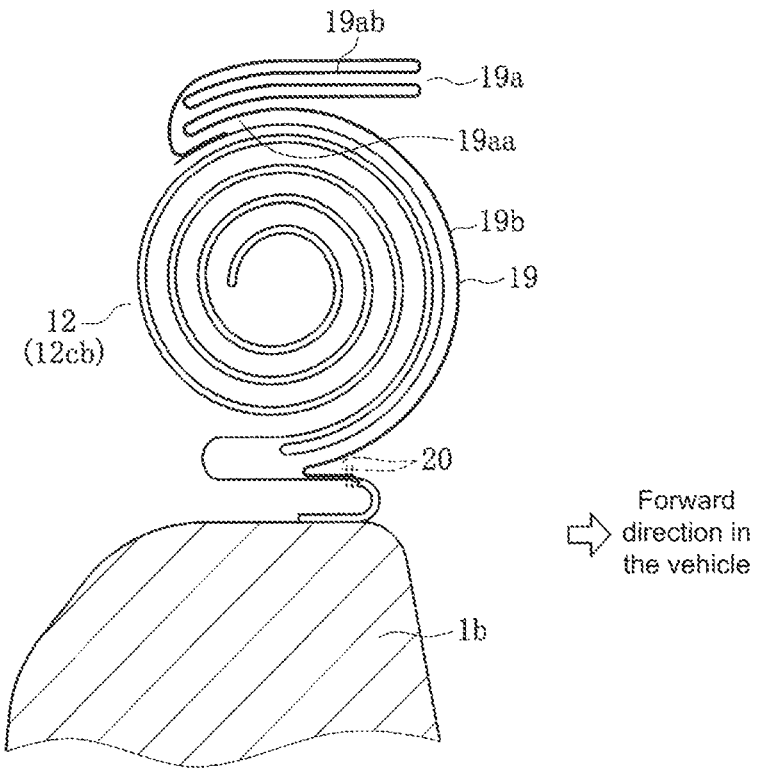
FIG. 4B is a diagram illustrating embodiment 1, a state in which a slip cloth is stowed when the airbag is rolled in a roll shape when the airbag device of the present invention is attached to the vehicle seat, viewed from direction A-A in FIG. 3B where the airbag is rolled into a roll shape.

When the airbag 12 is housed in the vehicle seat 1, an upper part 19a of the slip cloth 19 shall be folded independently from the rolling or folding of the airbag 12, as illustrated in FIG. 4A and FIG. 4B, for example. Note that the upper part 19a of the slip cloth 19 when the airbag 12 is stowed corresponds to the forward part when the airbag is expanded and deployed.

In this case, the folded upper part 19a is positioned on the upper side of the head protecting chamber 12cb which is folded into a bellows shape, as illustrated in FIG. 4A. Or, the upper part is positioned on the upper side of the head protecting chamber 12cb which is rolled into a roll shape, as illustrated in FIG. 4B. Note that a lower part 19b of the slip cloth 19, which is continuous with the upper part 19a thereof, passes in front of the head protecting chamber 12cb that is either rolled into a roll shape or folded, and leads to the connecting part 20 positioned on the upper side of the backrest portion 1b.

Specifically, the upper part 19a of the slip cloth 19 has a rear extending part 19aa that extends rearward along the upper surface of the airbag 12, and a bellows shape part 19ab folded into a bellows shape upward from the rear extending part 19aa. The rear extending part 19aa is on the sewed part 20 side of the upper part 19a. In addition, in FIG. 4A and FIG. 4B, an end part further continues from the bellows shape part 19ab (front end part when expanded and deployed), and this end part passes behind the bellows shape part 19ab, corresponding to the end part of the head protecting chamber 12cb (front end part when expanded and deployed). Note that the slip cloth 19 and head protecting chamber 12cb may or may not be connected at this contact point.

Regarding the airbag device 11 of the present invention stowed in the vehicle seat 1 of the present invention, when subjected to an impact on the vehicle due to a collision, rollover, or the like, a sensor signal causes gas to eject from the inflator 13 to expand and deploy the airbag 12 as described below.

The ejected gas is guided to the head protecting chamber 12cb and side protecting chambers 12ca via a gas guide 18, expanding and deploying the head protecting chamber 12cb and side protecting chambers 12ca.

Of these, if the headrest 1c is separately attached to the backrest portion 1b of the vehicle seat 1, the head protecting chamber 12cb expands and deploys from the upper part of the backrest portion 1b bursting over the headrest 1c. Further, if the headrest 1c is integrally formed with the backrest portion 1b, the head protecting chamber 12cb expands and deploys forward from the upper part of the backrest portion 1b (headrest 1c). On the other hand, the side protecting chambers 12ca expand and deploy forward from the left and right side portions of the backrest portion 1b of the vehicle seat 1.

Figure 5A:
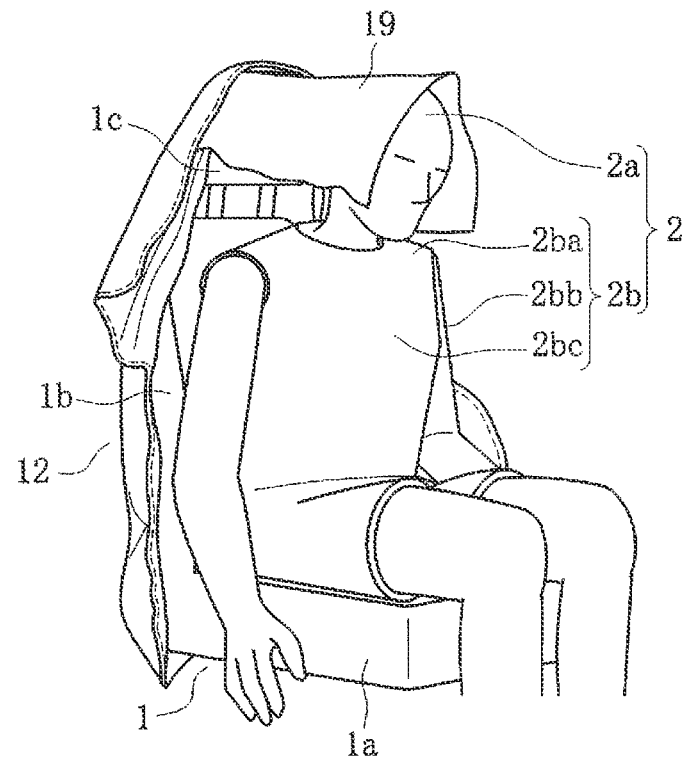
FIG. 5A is a diagram illustrating a state where the slip cloth that has been ejected out of the vehicle seat covers the head of an occupant who has moved forward from the regular seating position.
Figure 5B:
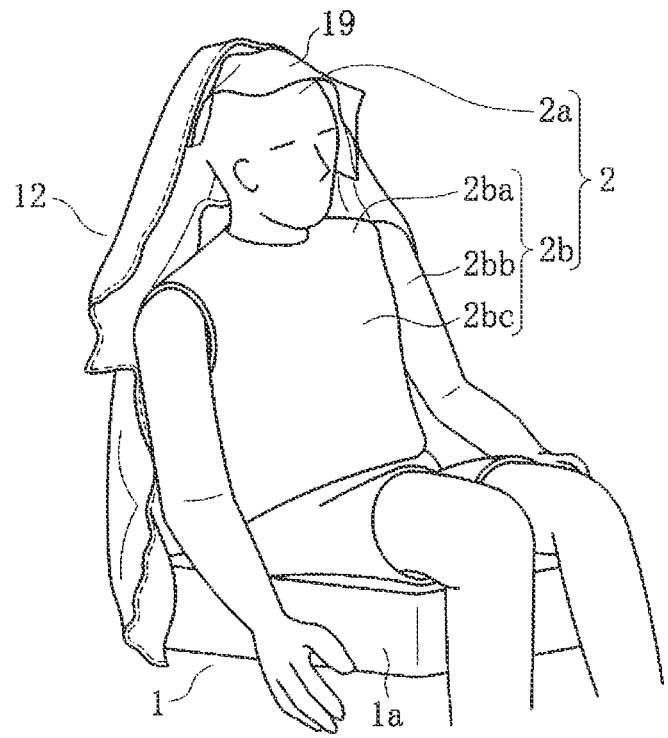
FIG. 5B is a diagram illustrating a state where the slip cloth that has been ejected out of the vehicle seat covers the head of an occupant who has moved diagonally forward from the regular seating position.

Here, as the upper end part of the airbag 12 (head protecting chamber 12cb) bursts over and in the forward direction of the vehicle, the slip cloth 19 also bursts out in the forward direction of the vehicle. Therefore, even if the occupant 2 moves from the regular seating position due to a collision or rollover, the slip cloth 19 is deployed to contact and cover the head 2a of the occupant 2, as illustrated in FIG. 5A and FIG. 5B. Note that FIG. 5A illustrates a case where the occupant 2 moves in the forward direction, and FIG. 5B illustrates a case where the occupant 2 moves diagonally forward.

Figure 6A:
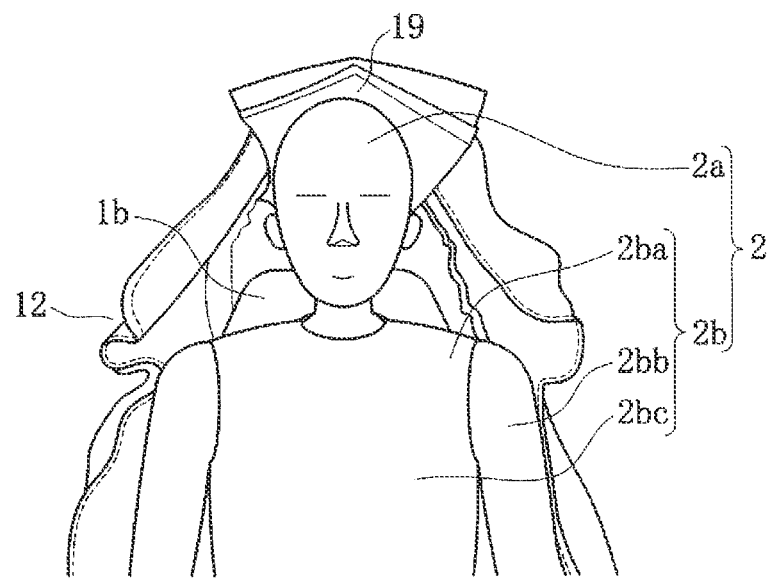
FIG. 6A is a diagram of the state of the airbag of the airbag device of the present invention immediately after the start of expansion and deployment, viewed from the front of the vehicle seat.
Figure 6B:
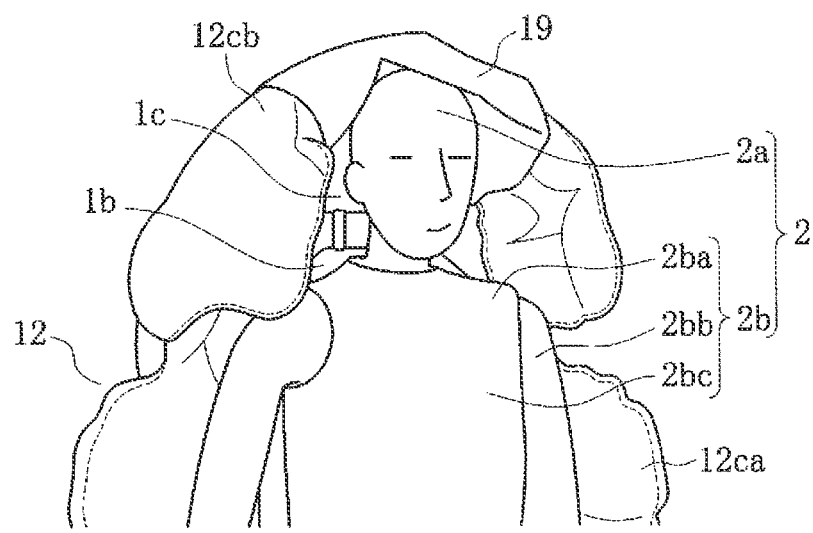
FIG. 6B is a diagram of the state of the airbag of the airbag device of the present invention during expansion and deployment, viewed from the front of the vehicle seat.
Figure 7A:
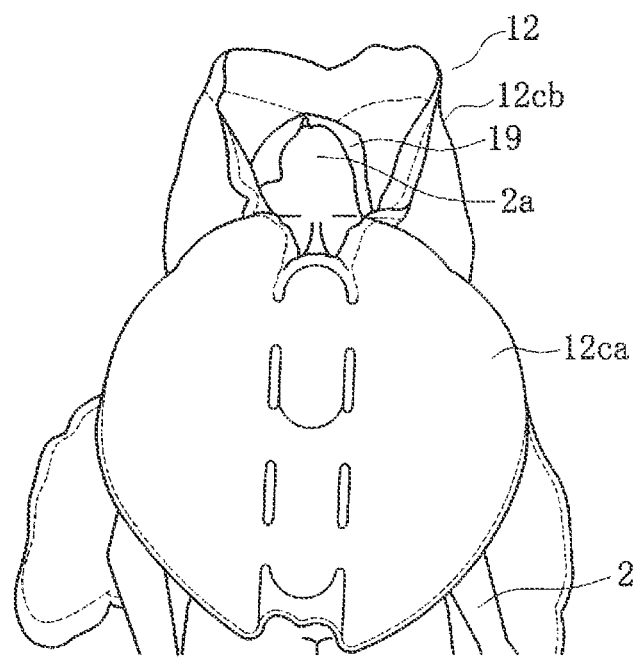
FIG. 7A is a diagram of the state of the airbag of the airbag device of the present invention immediately after expansion and deployment, viewed from the front of the vehicle seat.
Figure 7B:
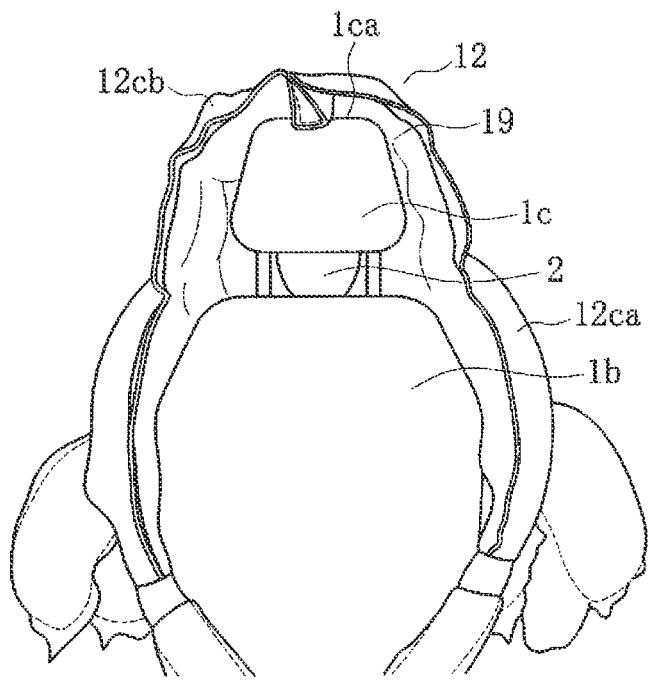
FIG. 7B is a diagram of the state of the airbag of the airbag device of the present invention immediately after expansion and deployment, viewed from the rear of the vehicle seat.

In this case, the airbag 12, which has expanded and deployed from a stowed state, expands and deploys from a state immediately after expansion and deployment starts as illustrated in FIG. 6A, in a manner where the head protecting chamber 12cb slides over the top of the slip cloth 19, as illustrated in FIG. 6B. As a result, as illustrated in FIG. 7A and FIG. 7B, the airbag 12 expands and deploys fully without stopping during expansion and deployment, integrally covering the head 2a, and the side portion 2b of the shoulder 2ba, upper arm 2bb, and chest 2bc of the occupant 2.

Needless to say, while the present invention is not limited to the aforementioned examples, the embodiments may be appropriately changed within the scope of the technical concepts described in each claim.

In other words, the airbag device and the vehicle seat described above are preferred examples of the present invention, and embodiments other than those described may also be implemented or executed via a variety of methods. Unless otherwise specified in the specification of the present application, there are no limitations to the shape, size, configuration, arrangement, and the like of the components illustrated in the attached drawings in the present invention. Furthermore, expressions and terms used in the specification of the present application are for the purpose of description and are not limiting unless otherwise specified.

For example, in embodiment 1 as illustrated in FIG. 4A and FIG. 4B, when the airbag 12 is stowed in the vehicle seat 1, the upper part 19*a* of the slip cloth 19 is folded independently to the airbag 12, and is positioned on the upper part of the airbag 12.

Figure 8A:
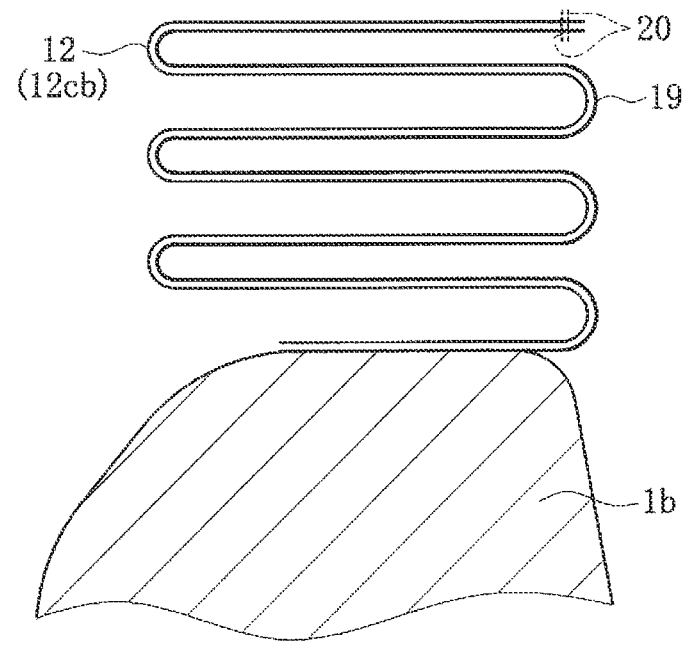
FIG. 8A is a diagram illustrating embodiment 2, the stowed state of the slip cloth for the case the airbag is folded in a bellows shape when the airbag device of the present invention is attached to the vehicle seat as viewed from the same direction as in FIG. 4.
Figure 8B:
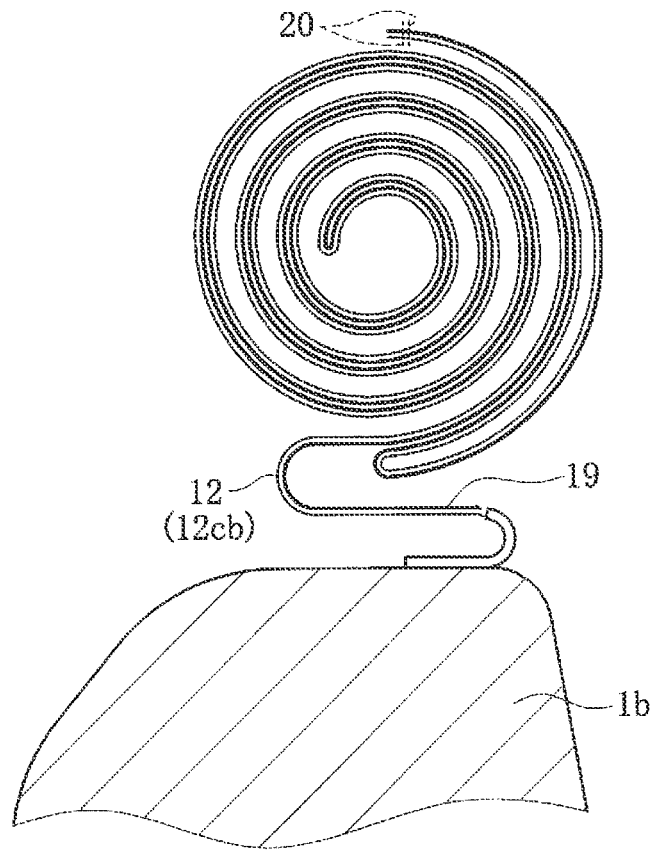
FIG. 8B is a diagram illustrating embodiment 2, the stowed state of the slip cloth for the case the airbag is rolled in a roll shape when the airbag device of the present invention is attached to the vehicle seat as viewed from the same direction as in FIG. 4.

However, as illustrated in embodiment 2 in FIG. 8A and FIG. 8B, the slip cloth can be stowed along the airbag 12. In other words, the airbag can be stowed in a manner where the slip cloth 19 is laid on the head protecting chamber 12*cb*, which are then rolled into a roll shape or folded into a bellows shape together.

Specifically, if the airbag 12 is stowed folded into a bellows shape, the slip cloth 19 is also folded into a bellows shape and stowed along the airbag 12, as illustrated in FIG. 8A. In this case, the connecting part 20 with the slip cloth 19 is provided on the non-attaching side between the head protecting chamber 12*cb* and the vehicle seat 1 (lower side as seen in FIG. 1). In addition, the opposite side of the connecting part 20 of the slip cloth 19 is sandwiched between the lowest surface of the head protecting chamber 12*cb* and the backrest portion 1*b*, and is not connected to the head protecting chamber 12*cb*.

On the other hand, if the airbag 12 is stowed rolled up in a roll shape, the slip cloth 19 is also rolled up in a roll shape and stowed along with the airbag 12, as illustrated in FIG. 8B. In this case, similar to FIG. 8A, a connecting part 20 for connecting with the slip cloth 19 is provided on the head protecting chamber 12*cb* on the side opposite that of the vehicle seat 1 (lower side as seen in FIG. 1). The side of the slip cloth 19 opposite the connecting part 20 is not connected to the head protecting chamber 12*cb*. Note that in FIG. 8B, a laminate is prepared with the slip cloth 19 on the head protecting chamber 12*cb*, and said laminate is folded near the middle thereof, overlapped, and rolled into a roll shape. Furthermore, the connecting part 20 side of the laminate is folded back at the lower part of the outer peripheral side of the roll, covering the front of the roll.

As illustrated in FIG. 8A and FIG. 8B, when the slip cloth 19 is stowed along with the airbag 12, the slip cloth 19 shall be connected to the head protecting chamber 12*cb* via the connecting part 20 on the non-attached side (lower side as seen in FIG. 1) of the vehicle seat 1, for example. In this manner, the slip cloth 19 will burst out in the forward direction of the vehicle along with the upper end part of the airbag 12.

In addition, with the slip cloth 19 as illustrated in FIG. 1, the direction in the up-down direction as seen in FIG. 1 shall be made the same length as the sheets 12*a* and 12*b*, and the length in the left-right direction as seen in FIG. 1 shall be made a length that can at least cover the upper end part 1 *ca* of the headrest 1*c* of the vehicle seat 1 (for example, two-thirds of the length Lcb as illustrated in FIG. 1).

However, the length in the up-down direction and length in the left-right direction as seen in FIG. 1 of the slip cloth 19 are not limited to those illustrated in FIG. 1.

The length in the left-right direction of the slip cloth 19 in FIG. 1, for example, can be set to roughly the maximum length the occupant 2 (with a seatbelt on) would move in the left-right direction from the regular seating position when the vehicle is impacted such as with a collision, rollover, or the like. Note that this maximum length is normally longer than the width of the upper end part 1*ca* of the headrest. In other words, the length in the left-right direction of the slip cloth 19 as in FIG. 1 can be longer than the dimensions of FIG. 1. In addition, the length in the up-down direction of the slip cloth 19 as seen in FIG. 1 can be set to the maximum length that the occupant 2 would move in the front-to-back direction from the regular seating position when the vehicle is impacted.

In FIG. 4A and FIG. 4B, the slip cloth 19 is connected to the airbag 12 only on the side where the airbag 12 is attached to the vehicle seat 1. In FIG. 8A and FIG. 8B, the slip cloth 19 is connected to the airbag 12 only opposite to the side where the airbag 12 is attached to the vehicle seat 1. However, the slip cloth 19 can also be connected to two locations, on the side where the airbag 12 is attached to the vehicle seat 1, and on the opposite side.

Figure 9:
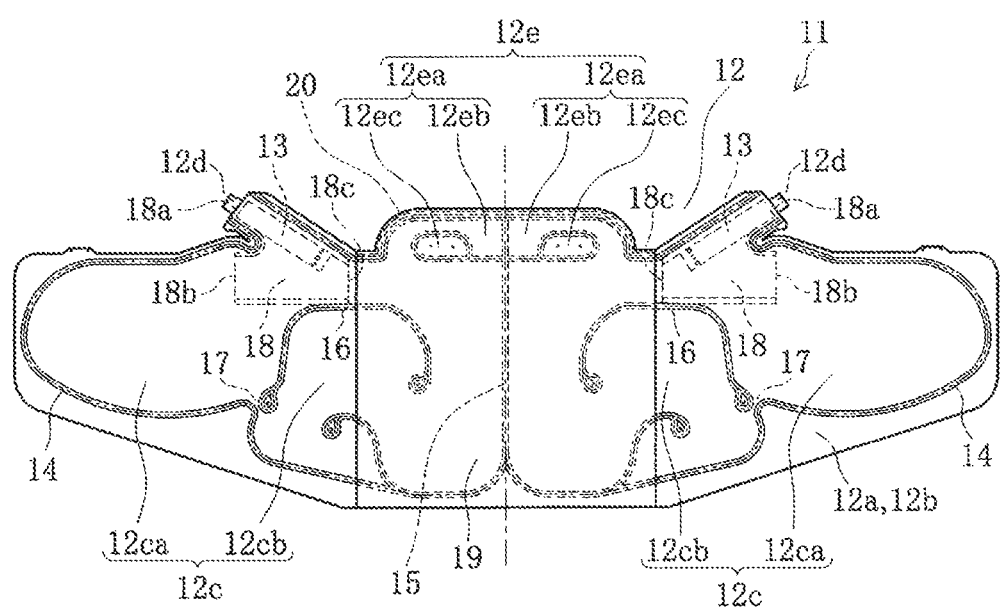
FIG. 9 is a diagram of embodiment 2 of the airbag that makes up the airbag device of the present invention, illustrating the airbag in a non-deployed state unfolded and laid flat.
Figure 10A:
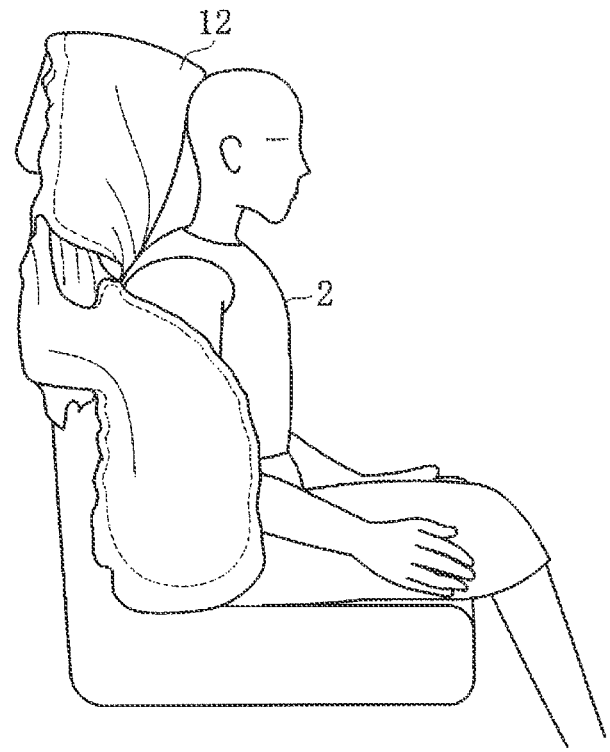
FIG. 10A is a diagram illustrating the state of the airbag that has been ejected out of the seat making contact with the head of an occupant who has moved forward from the regular seating position, causing the airbag to stop during expansion and deployment.
Figure 10B:
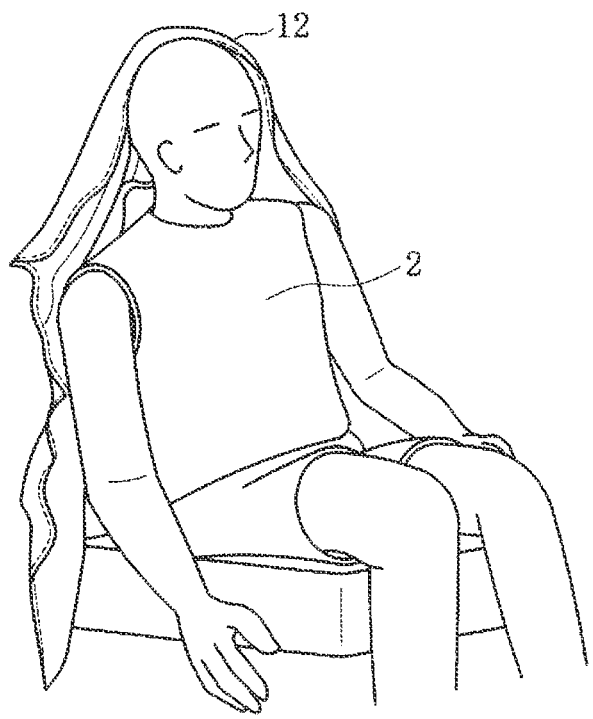
FIG. 10B is a diagram illustrating the state of the airbag that has been ejected out of the seat making contact with the head of the occupant who has moved diagonally forward from the regular seating position, causing the airbag to stop during expansion and deployment.

The airbag 12 is not limited to the configuration illustrated in FIG. 1, but can also include a guide 12*e* on an upper center portion of the airbag 12, as illustrated in FIG. 9. The guide 12*e* includes two sub-regions 12*ea* that sandwich the sewed part 15 in the central portion of the left-right direction and are each made up of an expansion region 12*eb* and a non-expansion region 12*ec*. Furthermore, in an early stage of deployment of the airbag 12, the two expansion regions 12*eb* expand fully before the chambers 12*c*, pulling the airbag 12 away from the backrest portion 1*b* and ensuring that the chambers 12*c* can reliably expand.

In addition, the airbag 12 illustrated in FIG. 1 and FIG. 9 is provided with a gas guide 18. However, the gas guide 18 may be omitted so long as the gas from the inflator 13 is reliably guided to the side protecting chambers 12*ca*, head protecting chamber 12*cb*, and expansion region 12*eb*.

The airbag device 11 that protects the head 2*a* of the occupant 2, and the side portion 2*b* of the shoulder 2*ba*, upper arm 2*bb*, and chest 2*bc* of the occupant 2 is described in the embodiments illustrated in FIG. 1 to FIG. 7. However, the present invention may be applied to an airbag device that protects the side portion 2*b* abdomen and waist of the occupant 2, in addition to the head 2*a* of the occupant 2 and the shoulder 2*ba*, upper arm 2*bb*, and chest 2*bc* of the occupant 2.

Furthermore, the airbag 12 described in FIG. 1 to FIG. 9 is formed by sewing two sheets 12*a* and 12*b* together, but may also be formed using a so-called "one-piece weaving" technique.

EXPLANATION OF CODES

1: Vehicle seat
1*b*: Seatback
1*c*: Headrest
1*ca*: Upper end part
2: Occupant
2*a*: Head region
2*b*: Side portion
11: Airbag device
12: Airbag
12*c*: Chamber
12*ca*: Side part protection chamber
12*cb*: Head region protection chamber
13: Inflator
19: Slip cloth
19*a*: Upper part
19*aa*: Rearward extending part
20: Sewed part

The invention claimed is:
1. An airbag device, comprising:
an airbag for integrally covering a head and sides of an occupant seated in a vehicle seat; and
an inflator for supplying gas to the airbag, wherein
in an expanded and deployed state when the airbag is fully expanded and deployed, the airbag includes a head protecting chamber for covering the head of the occupant and a pair of side protecting chambers adapted to be positioned on a left and a right of the head protecting chamber that cover the sides of the occupant, and the airbag is provided with a slip cloth arranged to deploy so as to cover the head of the occupant when the airbag expands and deploys with the slip cloth positioned on the head protecting chamber in the expanded and deployed state facing the head of the occupant, and has a lower dynamic coefficient of friction than an outer surface of the airbag, wherein the slip cloth is stowed with an upper part thereof folded independently to the airbag.

2. The airbag device according to claim 1, wherein when the airbag when unexpanded is unfolded and laid flat, a first length of the slip cloth in a front-to-back direction is substantially a same length as a second length of the head protecting chamber in the front-to-back direction.

3. The airbag device according to claim 1, wherein when the airbag is unexpanded and is unfolded and laid flat, a length of the slip cloth in a left-right direction is at least capable of covering an upper end part of a headrest of the vehicle seat.

4. The airbag device according to claim 2, wherein when the airbag is unexpanded and is unfolded and laid flat, a length of the slip cloth in a left-right direction is at least capable of covering an upper end part of a headrest of the vehicle seat.

5. The airbag device according to claim 1, wherein the slip cloth is connected to the airbag on one of either a first side where the airbag is attached to the vehicle seat or a second side opposite to where the airbag is attached to the vehicle seat.

6. The airbag device according to claim 5, wherein a connection between the slip cloth and the second side of the airbag opposite to where the airbag is attached to the vehicle seat is achieved by connecting near a front end part of the slip cloth and near a front end part of the airbag.

7. The airbag device according to claim 1, wherein the slip cloth is connected to the airbag on two locations, on a side where the airbag is attached to the vehicle seat, and on an opposite side to where the airbag is attached to the vehicle seat.

8. The airbag device according to claim 1, wherein the slip cloth is rolled into a roll shape or folded into a bellows shape overlapping the airbag and stowed in the vehicle seat.

9. The airbag device according to claim 1, wherein on an upper side of the airbag in a folded or rolled state, the upper part of the slip cloth that is continuous with a portion of the slip cover that extends from below has a rearward extending part that extends backward along an upper surface of the airbag and a bellows-like portion that is folded upward from the rearward extending part in a bellows-like manner.

10. A vehicle seat, wherein the airbag device according to claim 1 is housed in a manner where the head protecting chamber is positioned on the upper part of a backrest portion of the vehicle seat and the side protecting chambers are positioned separated and facing each other on both sides in a left-right direction of the backrest portion, such that the slip cloth covers the head of the occupant in the expanded and deployed state.

11. An airbag device, comprising:

an airbag for integrally covering a head and sides of an occupant seated in a vehicle seat;

a slip cloth for deployment with the airbag, the slip cloth stowed with an upper part thereof folded independently to the airbag, the slip cover having a lower dynamic coefficient of friction than an outer surface of the airbag; and an inflator for supplying gas to the airbag.

12. The airbag device of claim 11, wherein the airbag is configured for integrally covering the head and the sides of the occupant seated in the vehicle seat.

13. The airbag device of claim 11, wherein:

in an expanded and deployed state when the airbag is fully expanded and deployed, the airbag includes a head protecting chamber for covering the head of the occupant and a pair of side protecting chambers adapted to be positioned on a left and a right of the head protecting chamber that cover the sides of the occupant.

14. The airbag device of claim 13, wherein:

the slip cloth is arranged to deploy to cover the head of the occupant when the airbag expands and deploys so as to be positioned on the head protecting chamber in the expanded and deployed state facing the head of the occupant.

* * * * *